United States Patent
Ma et al.

(10) Patent No.: US 10,579,394 B2
(45) Date of Patent: Mar. 3, 2020

(54) CONTROL METHOD AND CONTROL DEVICE

(71) Applicant: Huawei Technologies Co., Ltd., Shenzhen (CN)

(72) Inventors: Jiuyue Ma, Beijing (CN); Yungang Bao, Beijing (CN); Rui Ren, Beijing (CN); Xiufeng Sui, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 15/337,498

(22) Filed: Oct. 28, 2016

(65) Prior Publication Data

US 2017/0046174 A1 Feb. 16, 2017

Related U.S. Application Data

(63) Continuation of application No. PCT/CN2015/076666, filed on Apr. 15, 2015.

(30) Foreign Application Priority Data

Apr. 30, 2014 (CN) .......................... 2014 1 0181775

(51) Int. Cl.
*G06F 9/4401* (2018.01)
*G06F 13/42* (2006.01)
*G06F 13/40* (2006.01)

(52) U.S. Cl.
CPC .......... *G06F 9/4411* (2013.01); *G06F 9/4406* (2013.01); *G06F 13/4022* (2013.01); *G06F 13/4282* (2013.01)

(58) Field of Classification Search
CPC ................................................... G06Q 20/102
See application file for complete search history.

(56) References Cited

U.S. PATENT DOCUMENTS 5,414,851 A 5/1995 Brice, Jr. et al.
5,499,379 A 3/1996 Tanaka et al.
(Continued)

FOREIGN PATENT DOCUMENTS

CN 101042582 A 9/2007
CN 101046749 A 10/2007
(Continued)

OTHER PUBLICATIONS

Machine Translation and Abstract of Japanese Publication No. JPH05134877, Jun. 1, 1993, 12 pages.
(Continued)

*Primary Examiner* — Henry Tsai
*Assistant Examiner* — Juanito Borromeo
(74) *Attorney, Agent, or Firm* — Conley Rose, P.C.

(57) ABSTRACT

A control method and a control device are provided. A router receives data sent by a first device, where the data carries an identifier of an input/output (I/O) device, determines, according to the identifier of the I/O device and a correspondence between the I/O device and a controller, a controller corresponding to the identifier of the I/O device, sends the data to the controller corresponding to the identifier of the I/O device such that the controller processes the data according to firmware code stored in the controller, receives the processed data sent by the controller, and sends the processed data to a second device, where the second device or the first device is the I/O device. The firmware code is generally programmable, and therefore a control device applying the foregoing control method can be relatively flexibly implemented.

18 Claims, 3 Drawing Sheets

(56) References Cited

U.S. PATENT DOCUMENTS

| | | | |
|---|---|---|---|
| 5,991,824 A | 11/1999 | Strand et al. | |
| 7,146,526 B2* | 12/2006 | Tomita | G06F 11/2058 714/6.23 |
| 7,343,442 B2 | 3/2008 | Rankin et al. | |
| 8,032,674 B2* | 10/2011 | Nguyen | G06F 3/0605 377/28 |
| 8,495,258 B2* | 7/2013 | Bakke | G06F 13/28 710/22 |
| 2002/0193081 A1 | 12/2002 | Kato | |
| 2003/0177297 A1 | 9/2003 | Hesse et al. | |
| 2003/0196003 A1 | 10/2003 | Shah | |
| 2009/0083760 A1* | 3/2009 | Slaight | G06F 13/4022 719/313 |
| 2009/0187706 A1 | 7/2009 | Honma | |
| 2011/0119606 A1 | 5/2011 | Abe | |

FOREIGN PATENT DOCUMENTS

| | | | |
|---|---|---|---|
| CN | 101593120 A | 12/2009 | |
| CN | 102467409 A | 5/2012 | |
| CN | 103235741 A | 8/2013 | |
| JP | H05134877 A | 6/1993 | |
| JP | H06035725 | 2/1994 | |
| JP | 2629278 B2 | 7/1997 | |
| JP | 2002330204 A | 11/2002 | |
| JP | 2005520248 A | 7/2005 | |
| JP | 4483947 B2 | 6/2010 | |
| JP | 2011107963 A | 6/2011 | |
| WO | 2008074212 A1 | 6/2008 | |

OTHER PUBLICATIONS

Foreign Communication From A Counterpart Application, Japanese Application No. 2016-565343, Japanese Office Action dated Jan. 23, 2018, 5 pages.
Foreign Communication From A Counterpart Application, Japanese Application No. 2016-565343, English Translation of Japanese Office Action dated Jan. 23, 2018, 5 pages.
Foreign Communication From A Counterpart Application, Chinese Application No. 201410181775.3, Chinese Office Action dated Jun. 23, 2017, 3 pages.
Machine Translation and Abstract of Chinese Publication No. CN101042582, Sep. 26, 2007, 9 pages.
Foreign Communication From A Counterpart Application, European Application No. 15785280.7, Extended European Search Report dated Apr. 12, 2017, 9 pages.
Foreign Communication From A Counterpart Application, PCT Application No. PCT/CN2015/076666, English Translation of International Search Report dated Jun. 29, 2015, 2 pages.
Foreign Communication From A Counterpart Application, PCT Application No. PCT/CN2015/076666, English Translation of Written Opinion dated Jun. 29, 2015, 8 pages.
Foreign Communication From A Counterpart Application, European Application No. 15785280.7, European Office Action dated Jul. 27, 2018, 7 pages.
Foreign Communication From A Counterpart Application, Korean Application No. 2019-014993574, Korean Notice of Allowance dated Feb. 27, 2019, 2 pages.
Bojnordi, M., et al., "PARDIS: A Programmable Memory Controller for the DDRx Interfacing Standards," Proceedings of the 39th Annual International Symposium on Computer Architecture(ISCA), Jul. 2012, 12 pages.
Foreign Communication From a Counterpart Application, Chinese Application No. 201410181775.3, Chinese Search Report dated Jun. 23, 2017, 3 pages.
Foreign Communication From a Counterpart Application, Chinese Application No. 201410181775.3, Chinese Office Action dated Jul. 5, 2017, 6 pages.
Machine Translation and Abstract of Japanese Publication No. JPH06-035725, Feb. 10, 1994, 38 pages.
Foreign Communication From a Counterpart Application, Korean Application No. 10-2016-7032928, Korean Notice of Allowance dated Feb. 27, 2019, 2 pages.

* cited by examiner

CONTROL METHOD AND CONTROL DEVICE

CROSS-REFERENCE TO RELATED APPLICATIONS

This application is a continuation of International Application No. PCT/CN2015/076666, filed on Apr. 15, 2015, which claims priority to Chinese Patent Application No. 201410181775.3, filed on Apr. 30, 2014. The disclosures of the aforementioned applications are hereby incorporated by reference in their entireties.

TECHNICAL FIELD

Embodiments of the present disclosure relate to computer technologies, and in particular, to a control method and a control device.

BACKGROUND

An input/output (I/O) chipset is an important component in a computer system, and its basic function is to connect a central processing unit (CPU) and an I/O device. The I/O chipset is a data path between the CPU and the I/O device.

In the prior art, the I/O chipset includes a quick path interconnect (QPI) bus interface connected to a CPU, a peripheral component interconnect express (PCIE) bus interface connected to an I/O device, and some other functional modules, for example, a functional module that implements an encryption function. However, functions implemented by the QPI interface, the PCIE interface, and the some other functional modules are built into the chipset. That is, once an I/O chipset is manufactured, its functions cannot be modified. Therefore, the I/O chipset cannot be flexibly implemented.

SUMMARY

To resolve the foregoing technical problem in the prior art, embodiments of the present disclosure provide a control method and a control device.

A first aspect of the embodiments of the present disclosure provides a control method, including receiving, by a router, data sent by a first device, where the data carries an identifier of an I/O device, determining, according to the identifier of the I/O device and correspondences between I/O devices and controllers, a controller corresponding to the identifier of the I/O device, sending the data to the controller corresponding to the identifier of the I/O device such that the controller processes the data according to firmware code stored in the controller, receiving the processed data sent by the controller, and sending the processed data to a second device, where the second device or the first device is the I/O device.

With reference to the first aspect, in a first possible implementation manner, the controller processes the data according to firmware code stored in the controller which includes reading the data from a queue in the controller into a buffer, and invoking the firmware code stored in a memory to process the data in the buffer.

With reference to the first possible implementation manner, in a second possible implementation manner, before determining, according to the identifier of the I/O device and correspondences between I/O devices and controllers, a controller corresponding to the identifier of the I/O device, the method further includes establishing a correspondence between the I/O device and the controller according to a functional requirement of the I/O device and a function implemented by the controller.

With reference to the first possible implementation manner, in a third possible implementation manner, the method further includes loading the firmware code into the controller using a basic I/O system (BIOS) or an operating system (OS).

With reference to any possible implementation manner of the first to third possible implementation manners, in a fourth possible implementation manner, the method further includes modifying the correspondence between the I/O device and the controller according to the functional requirement of the I/O device.

With reference to any possible implementation manner of the first to third possible implementation manners, in a fifth possible implementation manner, the method further includes modifying the firmware code of the controller according to the functional requirement of the I/O device.

A second aspect of the embodiments of the present disclosure provides a control method, including receiving, by a controller, data, and processing the data according to firmware code stored in the controller, and sending, by the controller, the processed data to a second device when the data is received from a first device, or sending, by the controller, the processed data to the router such that the router sends the processed data to a second device when the data is received from a first device using a router, where the second device or the first device is an I/O device.

With reference to the second aspect, in a first possible implementation manner, processing, by the controller, the data according to firmware code stored in the controller includes reading the data from a queue in the controller into a buffer, and invoking the firmware code stored in a memory to process the data in the buffer.

With reference to the first possible implementation manner of the second aspect, in a second possible implementation manner, the method further includes loading the firmware code into the controller using a BIOS or an OS.

With reference to the second aspect or the first possible implementation manner, in a third possible implementation manner, the method further includes modifying the firmware code of the controller according to a functional requirement of the I/O device.

A third aspect of the embodiments of the present disclosure provides a control device, including a router and at least two controllers, where the router is configured to receive data sent by a first device, where the data carries an identifier of an I/O device, determine, according to the identifier of the I/O device and correspondences between I/O devices and controllers, a controller, of the at least two controllers, corresponding to the identifier of the I/O device, and sending the data to the controller corresponding to the identifier of the I/O device. The controller corresponding to the identifier of the I/O device is configured to process the data according to firmware code stored in the controller in order to obtain the processed data, and send the processed data to the router. The router is further configured to send the processed data to a second device, and the second device or the first device is the I/O device.

With reference to the third aspect, in a first possible implementation manner, the controller includes a memory configured to store the firmware code, a buffer configured to store the data that is read from a queue in the controller by a processor, and the processor configured to invoke the firmware code stored in the memory to process the data in the buffer in order to obtain the processed data, and send the processed data to the router.

With reference to the third aspect or the first possible implementation manner, in a second possible implementation manner, the router is further configured to establish a correspondence between the I/O device and a controller according to a functional requirement of the I/O device and functions implemented by the at least two controllers.

With reference to the third aspect or the first or the second possible implementation manner, in a third possible implementation manner, the controller is further configured to receive the firmware code loaded by a BIOS or an OS.

With reference to the third aspect or any possible implementation manner of the first to third possible implementation manners, in a fourth possible implementation manner, the router further includes a router programming interface configured to modify the correspondence between the I/O device and the controller according to the functional requirement of the I/O device.

With reference to the third aspect or any possible implementation manner of the first to fourth possible implementation manners, in a fifth possible implementation manner, the controller further includes a controller programming interface configured to modify the firmware code of the controller according to the functional requirement of the I/O device.

According to the control method and the control device that are provided in the embodiments of the present disclosure, a router receives data sent by a first device, where the data carries an identifier of an I/O device, determines, according to the identifier of the I/O device and correspondences between I/O devices and controllers, a controller corresponding to the identifier of the I/O device, and sends the data to the controller corresponding to the identifier of the I/O device such that the controller processes the data according to firmware code stored in the controller, and the router receives the processed data sent by the controller, and sends the processed data to a second device, where the second device or the first device is the I/O device. In the embodiments of the present disclosure, the firmware code is generally programmable, and therefore a control device (which may be an I/O chipset) applying the foregoing control method can be relatively flexibly implemented.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
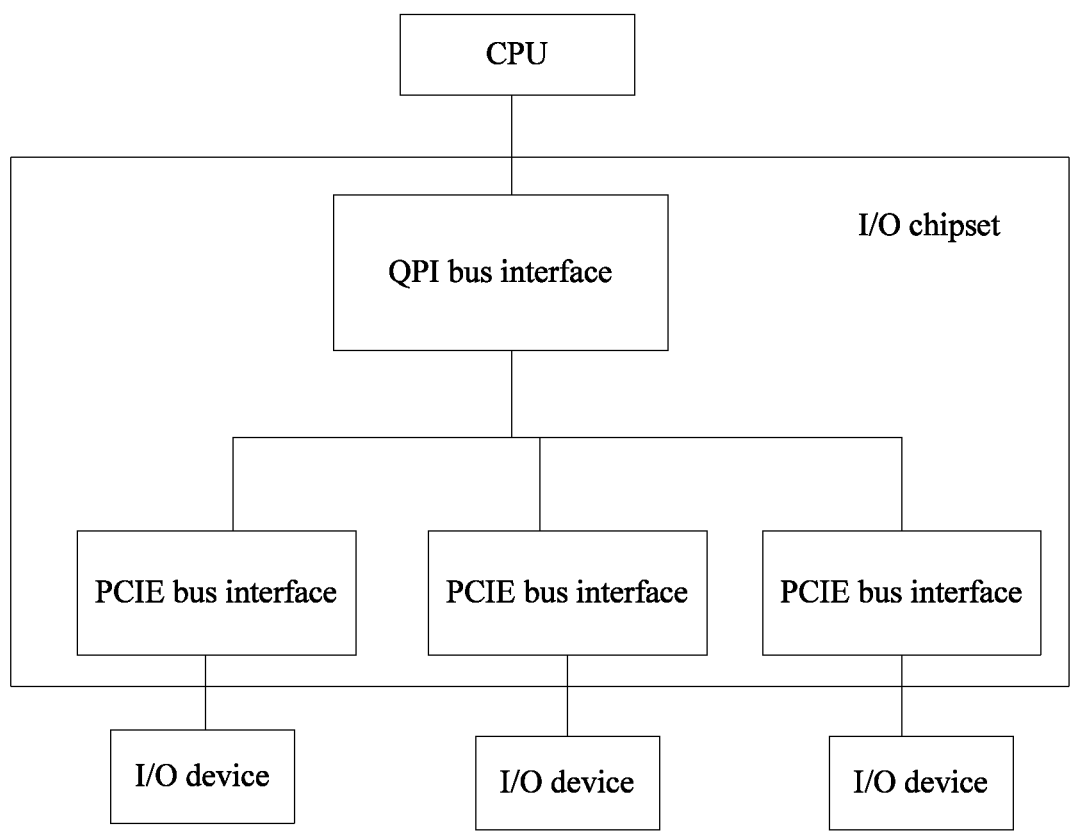
FIG. 1 is a schematic structural diagram of an I/O chipset.

Generally, a computer includes at least one I/O chipset. For example, a motherboard includes at least one I/O chipset. A major function of the I/O chipset is to forward data communicated between an I/O device and a CPU. FIG. 1 is a schematic structural diagram of an I/O chipset. As can be seen in FIG. 1, the I/O chipset includes a CPU bus interface and an I/O bus interface. In an example in FIG. 1, the CPU bus interface is shown as a QPI bus interface. The QPI bus interface is only one type of CPU bus interface, and the QPI bus interface is configured to connect a CPU. In the example in FIG. 1, the I/O bus interface is shown as a PCIE bus interface connected to a device. The PCIE bus interface is only one type of I/O bus interface, and is configured to connect an I/O device. Certainly, the I/O chipset may further include another interface or functional module (not shown). However, functions implemented by the QPI interface, the PCIE interface, and some other functional modules are built into the chipset. Therefore, the I/O chipset cannot be flexibly implemented.

An I/O chipset cannot be flexibly implemented using a solution in the prior art. In the technical solutions in the present disclosure, a router receives data sent by a first device, and determines, according to an identifier of an I/O device that is carried in the data and correspondences between I/O devices and controllers, a controller corresponding to the identifier of the I/O device. The controller stores a piece of firmware code, where the firmware code can be used to implement a function or a group of functions correspondingly, for example, implementing encryption, decryption, compression, bandwidth allocation, and/or like. The router sends the data to the controller corresponding to the identifier of the I/O device. The controller processes the data, and sends the processed data to the router, and the router sends the data processed by the controller to a second device. In the embodiments of the present disclosure, the first device or the second device is the I/O device. That is, the second device is the I/O device if the first device is a CPU, or the second device is a CPU if the first device is the I/O device. In the embodiments of the present disclosure, the firmware code is generally programmable, and therefore a control device (which may be an I/O chipset) applying the foregoing control method can be relatively flexibly implemented.

The following describes in detail the technical solutions in the present disclosure using specific embodiments. The following specific embodiments may be combined, and for a same or similar concept or process, details may be not described in some embodiments.

Figure 2:
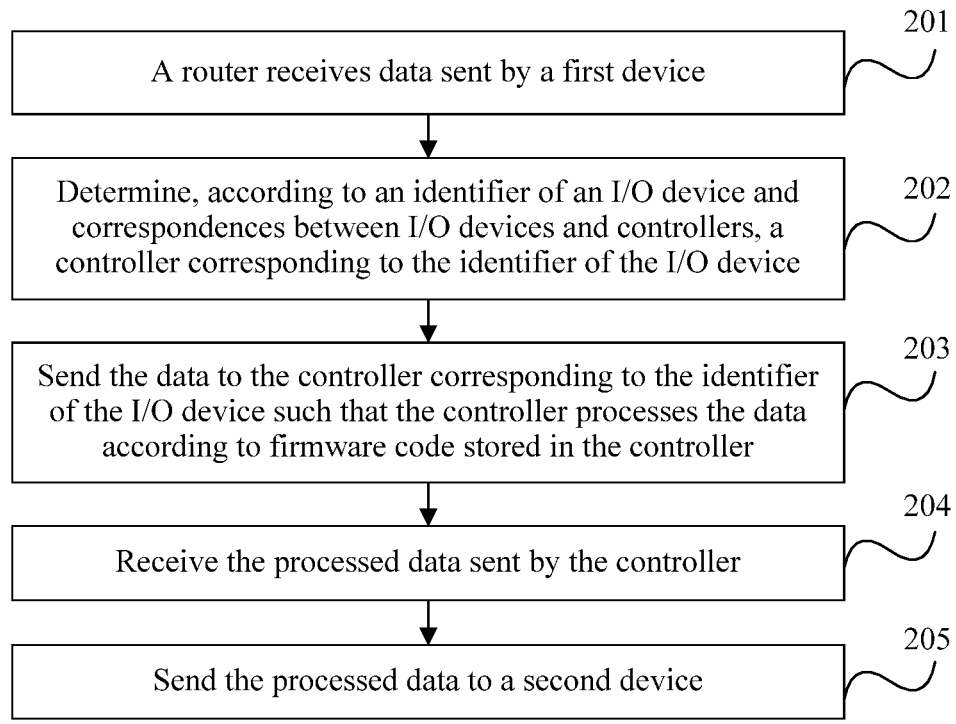
FIG. 2 is a schematic flowchart of Embodiment 1 of a control method according to the present disclosure.

FIG. 2 is a schematic flowchart of Embodiment 1 of a control method according to the present disclosure. As shown in FIG. 2, the method according to this embodiment includes the following steps.

Step S201: A router receives data sent by a first device.

The data sent by the first device carries an identifier of an I/O device.

The first device may be a CPU or an I/O device. The data may be data sent by a CPU to an I/O device, or be data sent by an I/O device to a CPU. No matter whether the data is sent by a CPU to an I/O device or sent by an I/O device to a CPU, the data carries the identifier of the I/O device. The identifier of the I/O device may be a name of the I/O device or a number of the I/O device, which is not limited in the present disclosure, provided that the I/O device can be uniquely identified.

Step S202: Determine, according to an identifier of an I/O device and correspondences between I/O devices and controllers, a controller corresponding to the identifier of the I/O device.

The router stores the correspondences between I/O devices and controllers. One controller can implement one function or a group of functions, for example, implement functions such as encryption, decryption, compression, and/or bandwidth allocation.

Generally, the correspondences between I/O devices and controllers are established according to functional requirements of the I/O devices and functions implemented by the controllers. For example, a correspondence between the I/O device 1 and the controller 1 is established if a functional requirement of an I/O device 1 is that data communicated between the I/O device 1 and the CPU needs to be encrypted, and a function implemented by a controller 1 is an encryption function, and a correspondence between the I/O device 2 and the controller 3 is established if a functional requirement of an I/O device 2 is that data communicated between the I/O device 2 and the CPU needs to be compressed, and a function implemented by a controller 3 is a compression function. A correspondence between another I/O device and a controller may be established in a similar manner, and details are not described herein.

When a functional requirement of an I/O device changes, an implementation manner includes that a correspondence between the I/O device and the controller is generally modified according to the functional requirement of the I/O device when a controller in an I/O chipset can implement a changed functional requirement of the I/O device. For example, functions that can be implemented by four current controllers in the I/O chipset are respectively as follows. The controller 1 implements an encryption function, a controller 2 implements a bandwidth allocation function, the controller 3 implements a compression function, and a controller 4 implements a decryption function. The functional requirement of the I/O device 1 changes from an encryption requirement to a compression requirement, and the controller 3 can implement the compression function. Therefore, it is only required that the correspondence between the I/O device 1 and the controller 1 be modified to a correspondence between the I/O device 1 and the controller 3.

When a functional requirement of an I/O device changes, another implementation manner includes that when a controller in an I/O chipset cannot implement a changed functional requirement of the I/O device, firmware code of the controller is generally modified according to the functional requirement of the I/O device. For example, the function implemented by the controller 1 may be modified from encryption to delay control if the functional requirement of the I/O device 1 changes from an encryption requirement to a delay control requirement. The function implemented by the controller is generally modified by modifying firmware code stored in the controller. A memory in the controller may store different firmware code. A processor in the controller invokes different firmware code to perform processing such that the controller can implement different functions. In addition, in this embodiment of the present disclosure, the firmware code is generally programmable, and therefore a control device (which may be an I/O chipset) applying the foregoing control method can be relatively flexibly implemented.

When a functional requirement of an I/O device changes, still another implementation manner includes that both a function of a controller and a correspondence between the I/O device and the controller are modified, provided that an established correspondence satisfies that the functional requirement of the I/O device is the same as the function implemented by the controller. Details are not described herein.

For the firmware code in the controller, the firmware code is generally loaded into the controller by a BIOS or an OS when the system starts. Generally, the correspondences between I/O devices and controllers are established after the firmware code is loaded into the controller. Certainly, the correspondences between I/O devices and controllers may be first established, and then corresponding code is loaded into the controller according to the correspondence, which is not limited in the present disclosure.

Step S203: Send the data to the controller corresponding to the identifier of the I/O device such that the controller processes the data according to firmware code stored in the controller.

The router sends the data to the controller corresponding to the identifier of the I/O device, and the controller processes the data.

Figure 3:
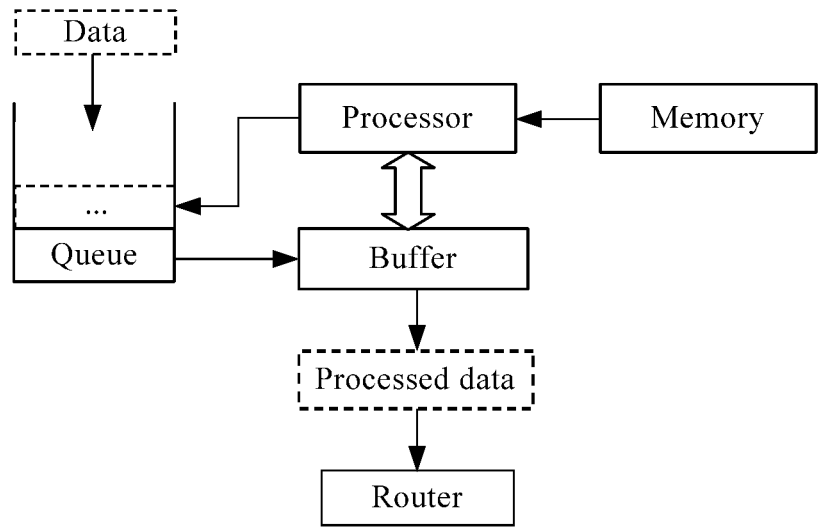
FIG. 3 is a schematic structural diagram of a controller according to the present disclosure.

FIG. 3 is a schematic structural diagram of a controller according to the present disclosure. As shown in FIG. 3, the controller includes a queue, a buffer, a processor, and a memory. The memory stores firmware code. The queue stores data sent by a router. Referring to FIG. 3, after receiving data communicated between a CPU and an I/O device, the router sends the data to the queue in the controller according to an identifier of the I/O device that is carried in the data. A processor in the controller reads the data from the queue in the controller to the buffer, invokes the firmware code stored in the memory to process the data in the buffer, and returns the processed data to the router.

Step S204: Receive the processed data sent by the controller.

After processing the data according to the stored firmware code, the controller returns the data to the router, and the router receives the processed data sent by the controller.

Step S205: Send the processed data to a second device.

The router sends the processed data to the second device. In this embodiment, the second device or the first device is the I/O device. That is, the second device is the I/O device if the first device is the CPU, or the second device is the CPU if the first device is the I/O device. Whether data is sent by the CPU to the I/O device or data is sent by the I/O device to the CPU, the technical solution in the present disclosure applies.

As can be seen from the description about the foregoing steps, a controller can load different code to implement different functions, that is, a function of the controller is changeable, and a correspondence between an I/O device and a controller that is stored in the router can also be modified as a functional requirement of the I/O device changes. Therefore, an I/O chipset including the foregoing router and controller can implement different functions, and the I/O chipset can be implemented very flexibly.

Figure 4:
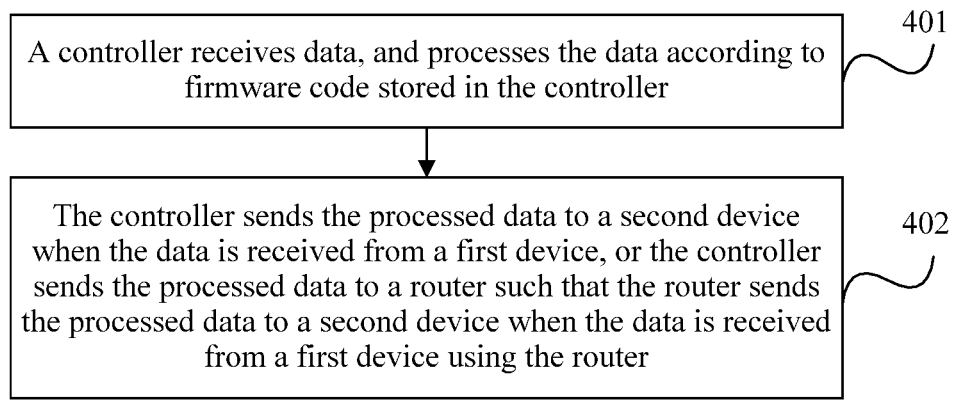
FIG. 4 is a schematic flowchart of Embodiment 2 of a control method according to the present disclosure.

FIG. 4 is a schematic flowchart of Embodiment 2 of a control method according to the present disclosure. Further, the method according to this embodiment is as follows.

Step S401: A controller receives data, and processes the data according to firmware code stored in the controller.

For a structure of the controller, reference may be made to FIG. 3. Further, the controller stores the received data to a queue. A processor in the controller reads the data from the queue in the controller to a buffer, and invokes firmware code stored in a memory to process the data in the buffer.

In an application scenario in which a router is included, the controller receives the data from the router. In an application scenario in which no router is included, the controller receives the data from a first device. The first device may be a CPU or an I/O device, where a second device is the I/O device when the first device is the CPU, or the second device is the CPU when the first device is the I/O device.

It should be noted that for the firmware code stored in the controller, the firmware code is generally loaded into the controller by a BIOS or an OS when the system starts. Further, the firmware code of the controller may be modified according to a functional requirement of the I/O device. For information about when and how the firmware code is modified, reference may be made to the detailed description in the embodiment shown in FIG. 2, and details are not described herein.

Step S402: The controller sends the processed data to a second device when the data is received from a first device, or the controller sends the processed data to a router when the data is received from a first device using the router such that the router sends the processed data to a second device.

That is, in a scenario in which no router is included, after processing the data, the controller directly sends the processed data to the second device. In a scenario in which a router is included, after processing the data, the controller returns the processed data to the router, and the router sends the processed data to the second device.

In this embodiment of the present disclosure, a controller receives data, and processes the data according to firmware code stored in the controller. The controller sends the processed data to a second device when the data is received from a first device, or the controller sends the processed data to the router such that a router sends the processed data to a second device when the data is received from a first device using the router. In this embodiment of the present disclosure, the firmware code is generally programmable, and therefore a control device (which may be an I/O chipset) applying the foregoing control method can be flexibly implemented.

Figure 5:
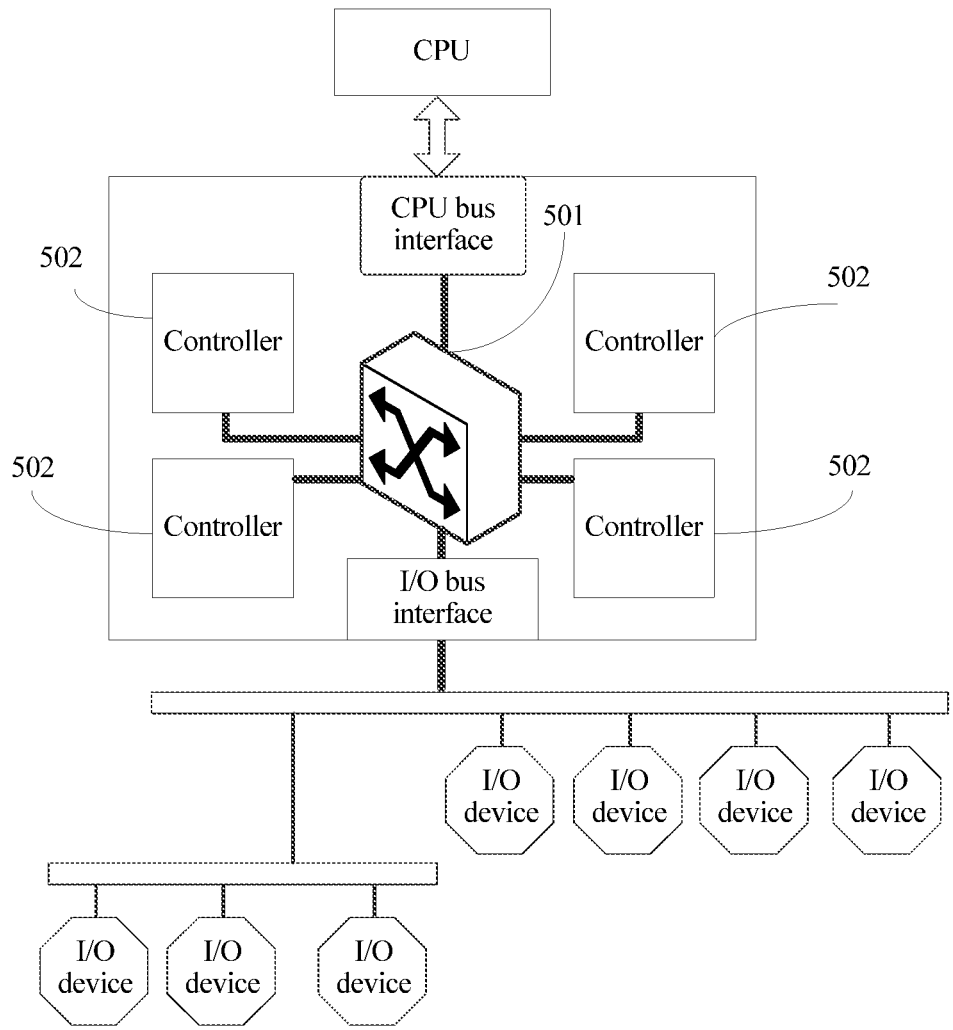
FIG. 5 is a schematic structural diagram of an embodiment of a control device according to the present disclosure.

FIG. 5 is a schematic structural diagram of an embodiment of a control device according to the present disclosure. In this embodiment, the control device is disposed on an I/O chipset in a computer. In terms of structure, the control device in this embodiment includes a router 501 and at least two controllers 502. In FIG. 5, only four controllers 502 are shown. A specific quantity of controllers 502 may be set according to an actual application, which is not limited in the present disclosure. The router 501 in the control device is configured to receive data sent by a first device, where the data carries an identifier of an I/O device. The router 501 determines, according to the identifier of the I/O device and correspondences between I/O devices and controllers 502, a controller 502 that is in the at least two controllers 502 and that is corresponding to the identifier of the I/O device, and sends the data to the controller 502 corresponding to the identifier of the I/O device. The controller 502 corresponding to the identifier of the I/O device processes the data according to firmware code stored in the controller 502 in order to obtain the processed data, and sends the processed data to the router 501. The router 501 is further configured to send the processed data to a second device. The second device or the first device is the I/O device.

FIG. 3 is a schematic structural diagram of any controller according to the embodiment shown in FIG. 5. Referring to FIG. 3, the controller includes a memory, a buffer, a queue, and a processor, where the memory is configured to store firmware code, the queue is used to receive data sent by a router, the buffer is used to store data that is read from the queue in the controller by the processor, and the processor is configured to invoke the firmware code stored in the memory to process the data in the buffer in order to obtain the processed data, and sends the processed data to the router. For a specific workflow of the controller, reference may be made to the detailed description in the method embodiment shown in FIG. 2, and details are not described herein.

It should be noted that, in the foregoing embodiments, different controllers may also share a memory to store firmware code, and the processor invokes corresponding firmware code.

In the foregoing embodiments, the router is further configured to establish the correspondences between I/O devices and controllers according to functional requirements of the I/O devices and functions implemented by the at least two controllers. For a specific establishment method, reference may be made to the detailed description in the method embodiment shown in FIG. 2, and details are not described herein.

In the foregoing embodiments, the controller is further configured to receive firmware code loaded by a BIOS or an OS. For detailed implementation, reference may be made to the detailed description in the method embodiment shown in FIG. 2, and details are not described herein.

In the foregoing embodiments, the router further includes a router programming interface configured to modify a correspondence between an I/O device and a controller according to a functional requirement of the I/O device. For information about when and how the correspondence is modified, reference may be made to the detailed description in the method embodiment shown in FIG. 2, and details are not described herein.

In the foregoing embodiments, the controller further includes a controller programming interface configured to modify the firmware code of the controller according to the functional requirement of the I/O device. For information about when and how the firmware code is modified, reference may be made to the detailed description in the method embodiment shown in FIG. 2, and details are not described herein.

According to the control device provided in the present disclosure, as can be seen from the foregoing description, a controller of the control device can load different firmware code to implement different functions, and a correspondence that is stored in a router of the control device can be modified as a user requirement changes. Therefore, an I/O chipset including the control device can implement different functions according to a requirement, and the I/O chipset can be implemented very flexibly.

Persons of ordinary skill in the art may understand that all or some of the steps of the method embodiments may be implemented by a program instructing relevant hardware. The program may be stored in a computer-readable storage medium. The steps of the method embodiments are performed when the program runs. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions in the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A control method, comprising:
   receiving, by a router in a control device, data comprising an input/output (I/O) device identifier of a first I/O device of a plurality of I/O devices, wherein the data is received from a central processing unit (CPU) through a CPU bus interface;
   selecting, by the router based upon the I/O device identifier, a selected controller from a plurality of controllers coupled to the router;
   sending, by the router, the data to the selected controller;
   receiving, by the router, processed data from the selected controller;
   sending, by the router, the processed data to the first I/O device through an I/O bus interface, wherein the I/O bus interface is coupled to the router and the I/O devices; and
   modifying, by a router programming interface of the router, a correspondence between the first I/O device and the selected controller upon a functional requirement of the first I/O device changing, wherein the correspondence between the first I/O device and the selected controller indicates that firmware code stored in the selected controller has been updated to match the functional requirement of the first I/O device.

2. The control method of claim 1, wherein the functional requirement of the first I/O device comprises one of encryption, decryption, compression, or bandwidth allocation.

3. The control method of claim 1, wherein the correspondence between the first I/O device and the selected controller is established according to the functional requirement of the first I/O device and a function implemented by the selected controller, and wherein the router selects the selected controller based upon the I/O device identifier and the correspondence.

4. The control method of claim 2, wherein the firmware code is loaded into the selected controller using a basic input/output system (BIOS).

5. The control method of claim 2, wherein the firmware code is loaded into the selected controller using an operating system (OS).

6. The control method of claim 1, further comprising continuing to transmit data between the CPU and the first I/O device after the functional requirement of the first I/O device has changed.

7. The control method of claim 1, further comprising pre-storing correspondences between the plurality of I/O devices and the plurality of controllers, wherein the correspondences are based at least in part on a functional requirement of each of the I/O devices and a firmware code stored by each of the controllers.

8. A control device, comprising:
   a central processing unit (CPU) bus interface configured to receive data from a CPU, wherein the data comprises an input/output (I/O) device identifier of a first I/O device of a plurality of I/O devices;
   a plurality of controllers;
   a router coupled to the CPU bus interface and the controllers, wherein the router is configured to:
      receive the data comprising the I/O device identifier;
      select a selected controller from the plurality of controllers based upon the I/O device identifier;
      transmit the data to the selected controller; and
      modify a correspondence between the first I/O device and the selected controller upon a functional requirement of the first I/O device changing, wherein the correspondence between the first I/O device and the selected controller indicates that firmware code stored in the selected controller has been updated to match the functional requirement of the first I/O device; and
   an I/O bus interface coupled to the router and the I/O devices, wherein the I/O bus interface is configured to receive processed data from the selected controller.

9. The control device of claim 8, wherein the functional requirement of the first I/O device comprises one of encryption, decryption, compression, or bandwidth allocation.

10. The control device of claim 8, wherein the correspondence between the first I/O device and the selected controller is established according to the functional requirement of the first I/O device and a function implemented by the selected controller, and wherein the router selects the selected controller based upon the I/O device identifier and the correspondence.

11. The control device of claim 8, wherein the firmware code is loaded into the selected controller using a basic input/output system (BIOS).

12. The control device of claim 8, wherein the firmware code is loaded into the selected controller using an operating system (OS).

13. The control device of claim 8, wherein the control device is further configured to continue to transmit data between the CPU and the first I/O device after the functional requirement of the first I/O device has changed.

14. The control device of claim 8, wherein the control device is further configured to pre-store correspondences between the plurality of I/O devices and the plurality of controllers, and wherein the correspondences are based at least in part on a functional requirement of each of the I/O devices and a firmware code stored by each of the controllers.

15. The control method of claim 1, further comprising processing, by the selected controller, data to produce the processed data.

16. The control method of claim 1, wherein the CPU bus interface is positioned between the router and the CPU, and wherein the I/O bus interface is positioned between the router and all of the I/O devices that communicate with the router.

17. The control device of claim 8, wherein the selected controller processes the data to produce the processed data.

18. The control device of claim 8, wherein the CPU bus interface is positioned between the router and the CPU, and wherein the I/O bus interface is positioned between the router and all of the I/O devices that communicate with the router.

* * * * *